Sept. 21, 1965   R. A. CUNNINGHAM   3,207,091
PELLETING MACHINE DRIVE
Filed April 29, 1963   2 Sheets-Sheet 2
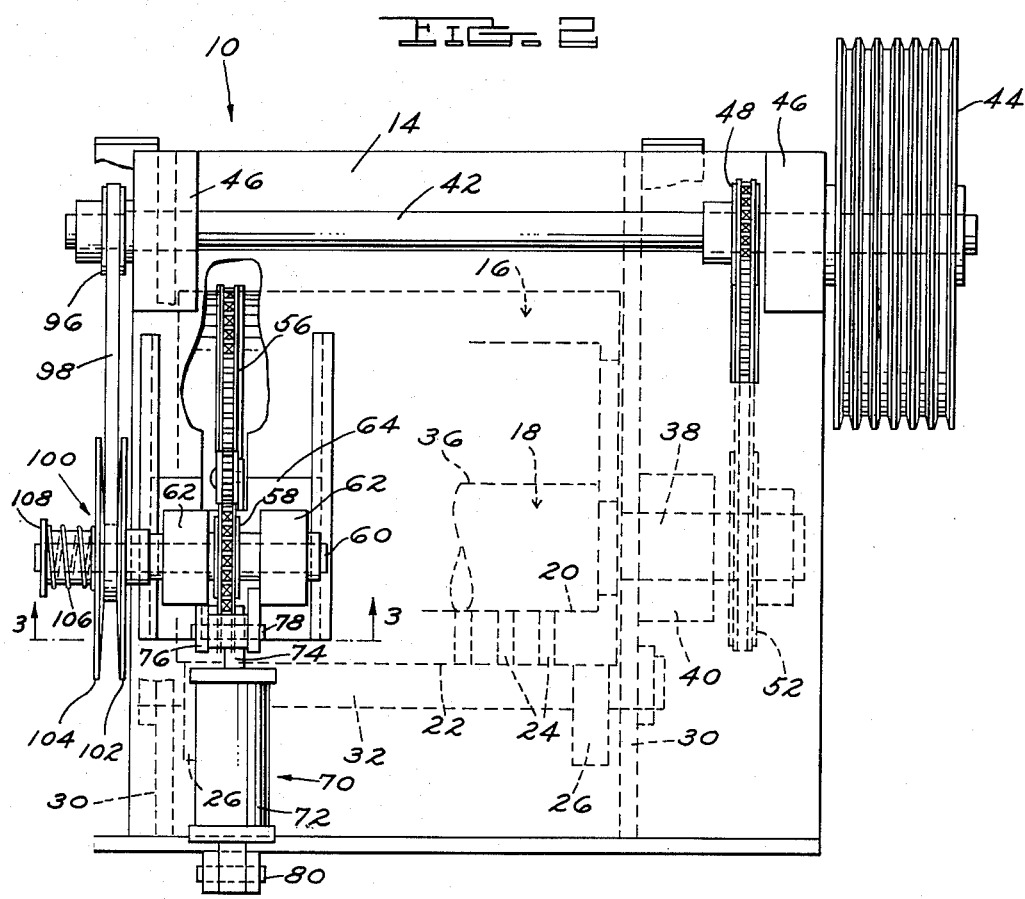
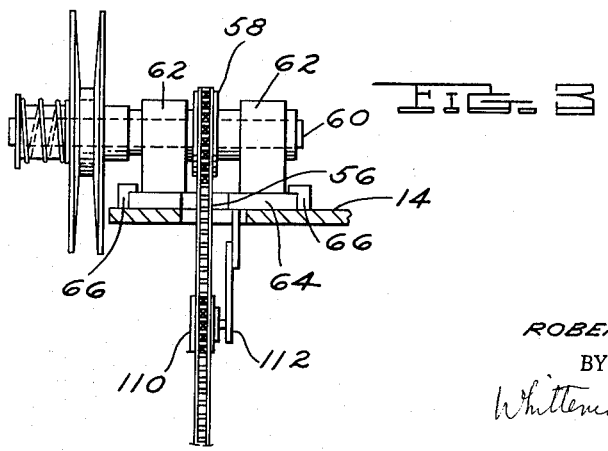
INVENTOR.
ROBERT A. CUNNINGHAM
BY
Whittemore, Hulbert & Belknap
ATTORNEYS 3,207,091
PELLETING MACHINE DRIVE
Robert A. Cunningham, Chicago, Ill., assignor to Cunningham & Sons, Chicago, Ill., a partnership
Filed Apr. 29, 1963, Ser. No. 276,415
7 Claims. (Cl. 107—14)

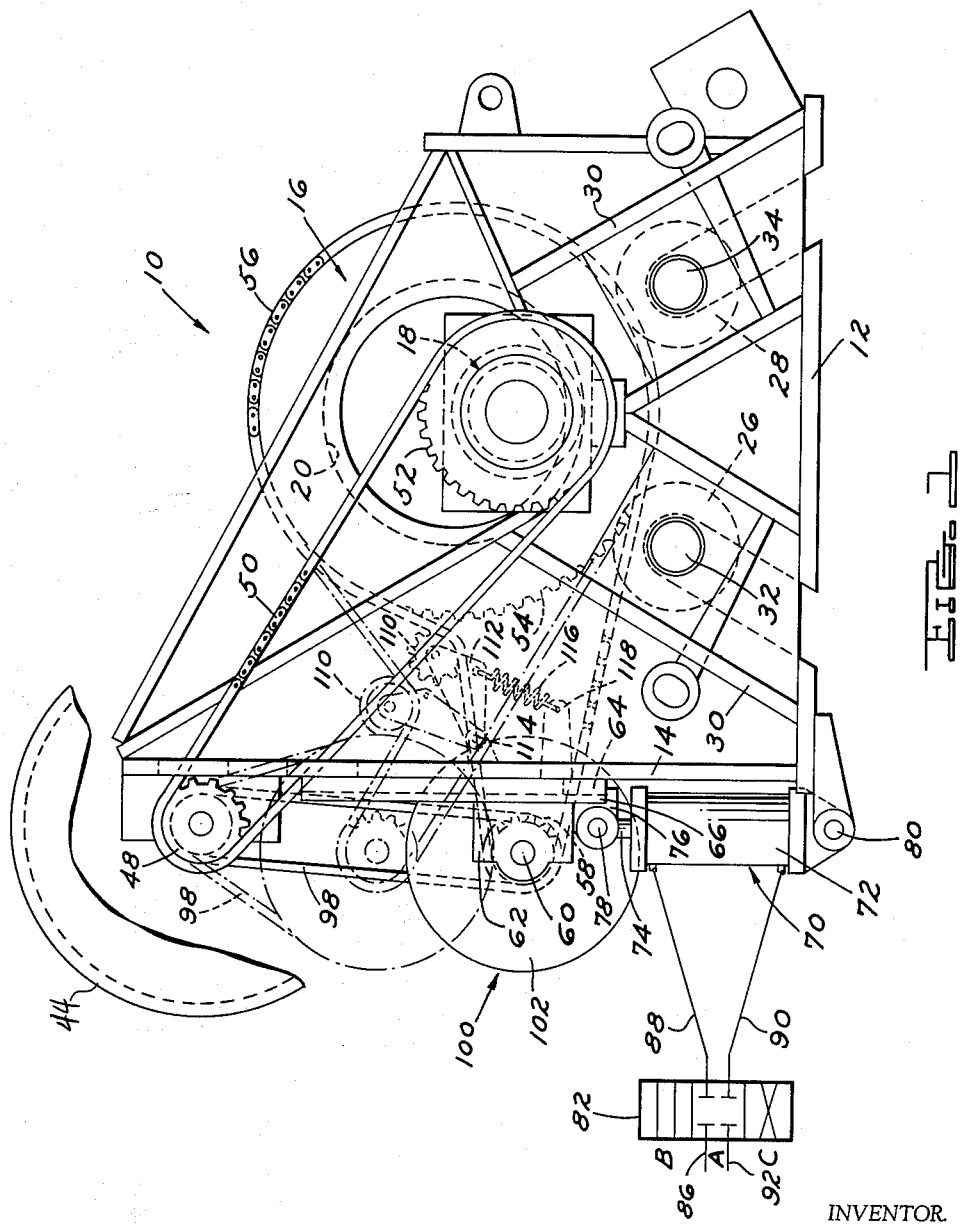

This invention relates generally to a machine for compressing a cut crop into pellet or wafer form.

An essential object of the invention is to provide a variable drive for a pelleting or wafering machine.

Another object is to provide a means for varying the density of the pellets.

Another object is to provide a means for varying the moisture content of the pellets.

Another object is to provide a machine for compressing and pelleting a cut crop having a rotatable ring or drum provided with holes through which the crop material is pressed, a presser roll for pressing the crop through the holes, and a drive for the ring and presser roll which is variable so that the ring and roll can be rotated at different speeds relative to each other.

Another object is to provide a first means for driving the presser roll at a given speed of rotation, and a second means for driving the ring or drum at an adjusted speed related to that of the presser roll.

Another object is to provide a variable driving connection between the first and second means so that the second means is actually driven by the first means.

Other objects and features of the invention will become apparent as the description proceeds, especially when taken in conjunction with the accompanying drawings, wherein:

FIGURE 1 is a side elevational view of a machine embodying my invention.

FIGURE 2 is a front elevation of the machine, looking towards the left in FIGURE 1.

FIGURE 3 is a sectional view taken substantially on the line 3—3 of FIGURE 2.

Referring now more particularly to the drawings, the machine is generally indicated at 10 and includes a frame having a base 12 and an upright front plate 14. The machine also includes a pelleting ring or drum 16 and a presser roll 18.

The drum 16 is supported with its axis extending horizontally and has the concentric radially inner and outer surfaces 20 and 22. Holes 24 extend radially through the wall of the drum from the radially inner to the radially outer surface. These holes can be arranged in any manner and provide passages through which the cut crop material can be pressed to form the material into pellets.

The drum 16 is supported for rotation by the back-up rolls 26 and 28. The back-up rolls are supported for rotation by the framework 30. Two back-up rolls 26 are provided in axial alignment with each other to support the drum near the ends and two axially aligned back-up rolls 28 are also provided to likewise support the drum near the ends. The pairs of rolls 26 and 28 in effect cradle the drum, and since the rolls 26 and 28 are free to turn, the drum can rotate on its own axis. The shafts 32 and 34 on which the rolls 26 and 28 are mounted, extend horizontally and are carried by the framework 30. The rolls 26 and 28 rotate freely on the shafts.

The presser roll 18 is a cylindrical member of considerably smaller diameter than the drum 16 and extends inside the drum with its axis of rotation parallel to the drum axis. The cylindrical surface 36 of the roll 18 approaches very closely to the inner surface 20 of the drum, although preferably it does not quite contact the inner surface. The roll 18 has a reduced spindle extension 38 journalled in a fixed bearing 40 of the framework 30. The opposite end of the roll 18 also has a reduced spindle extension (not shown) which is similarly mounted for rotation in a fixed bearing.

The presser roll 18 is rotated by a driven shaft 42, which shaft is operated by an electric motor or other power source (not shown) through a pulley 44 fixed on the end of the shaft. The shaft is mounted in the fixed bearings 46 on the upright frame 14 of the machine and has a pocket 48 fixed on it for driving the presser roll 18. As seen in FIGURES 1 and 2, a chain 50 extends over the sprocket 48 and around a sprocket 52 fixed on spindle 38 of the presser roll so that rotation of the shaft 42 produces rotation of the presser roll.

The pelleting ring or drum 16 has a sprocket 54 encircling its outer surface 22, and a chain 56 extends over the sprocket 54 and over a sprocket 58 on the shaft 60, so that rotation of the shaft 60 imparts rotation to the drum 16. The shaft 60 is journalled in bearings 62 on a vertically slidable plate 64. Angle guides 66 secured to the front surface of frame member 14 define a vertical guide for the up and down movement of plate 64. The plate 64 may be raised and lowered and held in any intermediate position by a hydraulic piston-cylinder assembly 70 which includes a cylinder 72, a piston (not shown) therein and a rod 74 extending from the piston through the end of the cylinder. The piston rod is connected to a bracket 76 on the plate 64 by a pin 78, and the lower end of the cylinder is pivoted to the base 12 of the fixed frame by a pin 80. A valve 82 is provided to deliver and exhaust hydraulic fluid to and from the ends of the cylinder. In the A position of the valve, the ends of the cylinder are sealed so that the piston cannot move, thereby holding the plate 64 in any position of vertical adjustment. In the B position of the valve, hydraulic fluid under pressure from line 86 is delivered to the rod end of the cylinder through line 88, and the head end of the cylinder is exhausted through line 90 to the tank line 92. In the C position of the valve the hydraulic lines are reversed to admit fluid under pressure to the head end of the cylinder and exhaust the other end. The valve 82 may be manually controlled.

The input shaft 60 is driven from shaft 42 by a pulley 96 on shaft 42, a belt 98 and a variable pulley 100 on shaft 60. The variable pulley comprises a disk-shaped flange 102 fixed on shaft 60 and a disk-shaped flange 104 axially slidably mounted on shaft 60 in spaced relation to flange 102. The confronting surfaces of the flanges are tapered so that they are farther apart at the outer periphery of the flanges than they are near shaft 60. In other words, the inner surfaces of the flanges are each in the form of a frustrum of a cone. A coil spring 106 encircles the shaft 60 and is compressed between an abutment 108 on the end of the shaft and the movable flange 104. The spring urges the movable flange 104 toward the fixed flange 102.

The belt 98 extends around the pulley 96 and the pulley 100, so that shaft 60 is driven by shaft 42. However, the effective radius of the pulley 100 depends on the vertical position of the pulley. When the pulley is in the lower position, shown in solid lines in FIGURES 1 and 2, the tension in belt 98 forces the flange 104 of the pulley away from the flange 102 so that the effective radius of the pulley 100 is small. Accordingly, the pulley 100 will be rotated at a relatively high rate of speed. When, however, the pulley is elevated to the dotted line position of FIGURE 1, the reduced tension in belt 98 permits the sliding flange 104 of the variable pulley 100 to be moved by spring 106 toward the fixed flange 102, thereby increasing the effective radius of the pulley because the belt 98 will engage the cone-shaped surfaces of the flanges nearer the outer periphery of the pulley. Accordingly, when the variable pulley is in the dotted line position of FIGURE 1, the shaft 60 will be driven at a relatively slower speed.

A take-up sprocket 110 is provided for the chain 56, to remove slack. The sprocket 110 is mounted on a swinging arm 112 which is pivoted to the fixed frame 14 at 114. A tension spring 116 connected at one end to the swinging arm 112 and at the other end to a bracket 118 fixed on frame 14 applies a downward tension on the take-up sprocket.

In operation, the presser roll 18 may be driven at a steady rate of speed by the shaft 42. The pelleting ring or drum 16 will also be driven by the shaft 42 so that its speed is related to the speed of the presser roll. The arrangement is such, however, that the peripheral or surface speed of the inner surface 20 of the drum 16 will not exceed the peripheral or surface speed of the outer surface 36 of the presser roll 18.

When the variable drive pulley 100 is in its lower or solid line position, the peripheral speed of the inner surface of the drum is substantially equal to the peripheral speed of the outer surface of the presser roll. However, as the variable drive pulley 100 is raised from the solid line position, the rotation of the drum becomes gradually and steadily slower. Obviously, therefor, the speed of the drum with respect to that of the presser roll can be varied within fairly wide limits. The position of the pulley 100 is very easily determined by the valve 82. To raise the pulley 100 or to lower it, the valve 82 is merely shifted to either the B or C position, and to hold the pulley in a desired position of vertical adjustment the valve is placed in the A position.

It has been found that when there is a difference in the speeds of the presser roll and drum, that is when the surface speed of the presser roll 18 exceeds the surface speed of the inner periphery 20 of the drum 16, a denser pellet is obtained. Also a greater amount of moisture is squeezed out of the pelleted material. The greater the difference in speed, the more dense the pelleted material becomes and the greater the amount of moisture squeezed out.

Normally when starting the machine, there will be an accumulation of dried out crop material. Accordingly the machine should be started with the variable pulley 100 at or near the solid line position in which the surface speeds of the drum and roll are nearly equal. This makes for easier starting. Also, it prevents burning of the crop material which might otherwise occur because of its dry condition. A greater amount of moisture in the crop material will permit operating the machine under conditions in which a relatively great difference in peripheral speeds exists because the moisture will prevent burning of the crop material. The difference in peripheral speeds produces considerable friction which produces enough heat to burn a relatively dry crop.

While the arrangement for rotating the drum 16 has been described as a drive, in a sense it may be considered a brake. That is because the presser roll tends to drive the drum at its own surface speed by friction through the crop material at the interface between surfaces 20 and 36 of the roll and of the drum. Particularly when the variable pulley 100 is raised near the dotted line position in FIGURE 1 in which the drum is rotated at a significantly lower speed than the presser roll, the chain and sprocket arrangement for controlling the rotation of the drum acts more in the nature of a brake because it produces a rotation of the drum which is actually slower than would be produced by friction alone.

The arrangement for controlling the speed of the drum described herein causes the drum to rotate slower than the presser roll. This is the preferred arrangement. Actually, the drum could be rotated at a greater speed, and the greater the speed differential the denser would be the pellet and the more moisture would be squeezed from the pellet.

What I claim as my invention is:

1. In a machine for compressing and pelleting a cut crop, a rotatable ring member having circumferentially spaced holes extending generally radially therethrough, a presser roll member mounted adjacent said ring member in position to press the cut crop into and through said holes, the axes of said members being parallel, drive means for rotating said members including a shaft, a first transmission from said shaft to one of said members for rotating the latter, and a second transmission from said shaft to the other of said members for rotating the latter, said second transmission being variable to adjust the speed of rotation of said other member relative to said one member, and means for varying said second transmission.

2. In a machine for compressing and pelleting a cut crop, a rotatable ring member having circumferentially spaced holes extending generally radially therethrough, a presser roll member mounted adjacent said ring member in position to press the cut crop into and through said holes, drive means for rotating said members including a shaft, a first transmission from said shaft to one of said members for rotating the latter, and a second transmission from said shaft to the other of said members for rotating the latter, said second transmission comprising a pulley, means operated by said pulley having a driving connection with said other member, a flexible linear member driven by said shaft and extending about said pulley to drive the latter, said pulley having relatively axially movable side flanges provided with opposed tapered surfaces engaging said linear member, resilient means urging said flanges relatively toward one another, means mounting said pulley for movement in opposite directions toward and away from said shaft to change the effective radius of said pulley and thereby adjust the speed of rotation thereof so as to vary the speed of rotation of said other member relative to said one member, and means for moving said pulley in said opposite directions.

3. The structure defined in claim 2, wherein said one member is said presser roll member and said other member is said ring member.

4. In a machine for compressing and pelleting a cut crop, a rotatable ring having circumferentially spaced holes extending generally radially therethrough, a presser roll mounted within said ring in position to press the cut crop into and through said holes, drive means for rotating said ring and said roll including a drive shaft, a first transmission from said drive shaft to said roll for rotating the latter, a second transmission from said drive shaft to said ring for rotating the latter, said second transmission comprising a pulley, a pulley shaft on which said pulley is secured, a support on which said shaft is journaled for rotation, a flexible linear member driven by said drive shaft and extending about said pulley to drive the latter, a second flexible linear member extending from said pulley shaft to said ring to transmit rotation from the former to the latter, said pulley having relatively axially movable side flanges provided with opposed tapered surfaces engaging said linear member, resilient means urging said flanges toward one another, means mounting said support for movement in opposite directions toward and away from said drive shaft to change the effective radius of said pulley and thereby adjust the speed of rotation thereof so as to vary the speed of rotation of said ring relative to said roll, and means for moving said support in said opposite directions.

5. In a machine for compressing and pelleting a cut crop, a rotatable ring having circumferentially spaced holes extending generally radially therethrough and through which the cut crop is to be pressed, a presser roll mounted inside said ring adjacent the inner surface thereof adapted to press the cut crop into and through said holes, first drive means for rotating said roll, second drive means for rotating said ring, said second drive means having an operative connection with said first drive means to be operated by the latter and thereby rotate said ring at a speed related to the speed of said roll, said operative connection being adjustable to vary the speed of said ring in relation to that of said roll, said operative connection comprising an endless flexible linear member driven by said first drive means, a power input shaft, a variable drive between said linear member and said input shaft including a pulley on said input shaft over which said linear member is received, said pulley having axially movable side flanges provided with opposed tapered surfaces, resilient means urging said flanges together, a movable support on which said shaft is journaled for rotation, guide means mounting said support for movement in opposite directions so as to change the effective radius of said pulley, and a second endless flexible linear member extending from said input shaft to said ring to transmit rotation from the former to the latter.

6. In a machine for compressing and pelleting a cut crop, a rotatable ring member having circumferentially spaced holes extending generally radially therethrough, a presser roll member mounted adjacent said ring member in position to press the cut crop into and through said holes, the axes of said members being parallel, and drive means for rotating said members, said drive means being variable to adjust the speed of rotation of one of said members relative to the other, and means for varying said drive means.

7. The structure defined in claim 6, wherein said drive means includes a pulley, and a power transmitting flexible linear member extending about said pulley, said pulley having relatively axially movable side flanges provided with opposed tapered surfaces engaging said linear member, and means for relatively axially moving said side flanges toward and away from each other to change the effective radius of said pulley.

References Cited by the Examiner
UNITED STATES PATENTS

| | | | |
|---|---|---|---|
| 1,467,883 | 9/23 | Sizer. | |
| 1,848,332 | 3/32 | Estes. | |
| 1,994,371 | 3/35 | Sizer | 107—8.35 |
| 2,063,404 | 12/36 | Selman. | |
| 2,177,132 | 10/39 | Crabtree | 18—12 X |
| 2,302,483 | 11/42 | Welty | 74—230.17 |
| 2,648,296 | 8/53 | Oliver | 18—12 X |
| 2,735,308 | 2/56 | Peterson | 74—230.17 |
| 2,896,461 | 7/59 | Grevich | 74—230.17 |
| 2,966,699 | 1/61 | Gregory. | |

WALTER A. SCHEEL, *Primary Examiner.*

UNITED STATES PATENT OFFICE
CERTIFICATE OF CORRECTION

Patent No. 3,207,091 September 21, 1965

Robert A. Cunningham

It is hereby certified that error appears in the above numbered patent requiring correction and that the said Letters Patent should read as corrected below.

Column 5, line 10, for "received" read -- reeved --.

Signed and sealed this 19th day of April 1966.

(SEAL)
Attest:

ERNEST W. SWIDER
Attesting Officer

EDWARD J. BRENNER
Commissioner of Patents